A. SCBESSY & S. REMUSZ.
ANTISKIDDING DEVICE FOR PNEUMATIC TIRES.
APPLICATION FILED JULY 22, 1914.
1,118,880.
Patented Nov. 24, 1914.
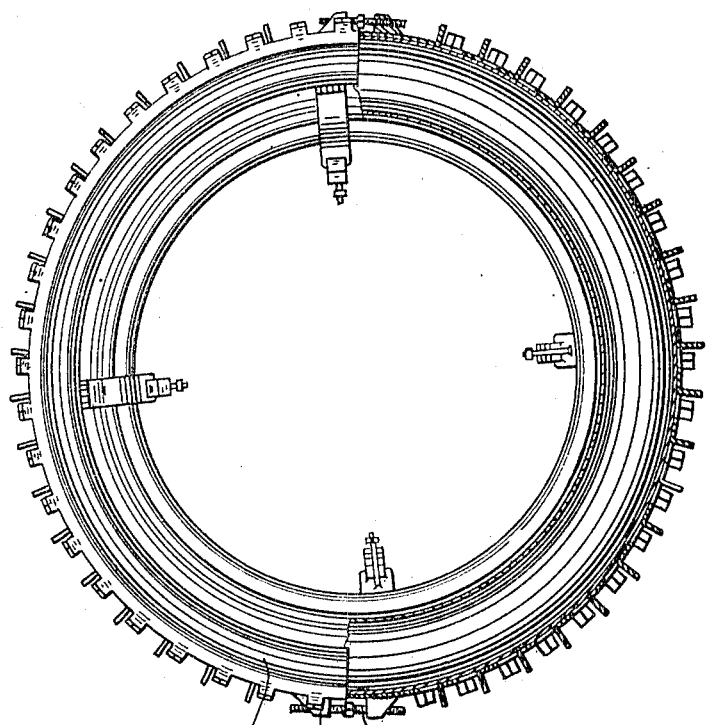
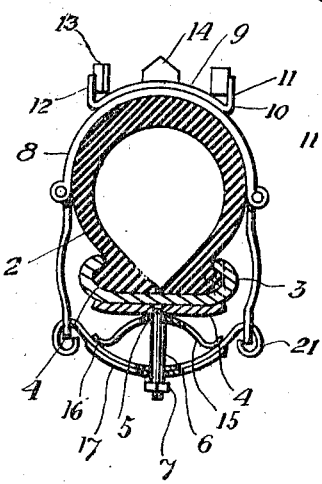
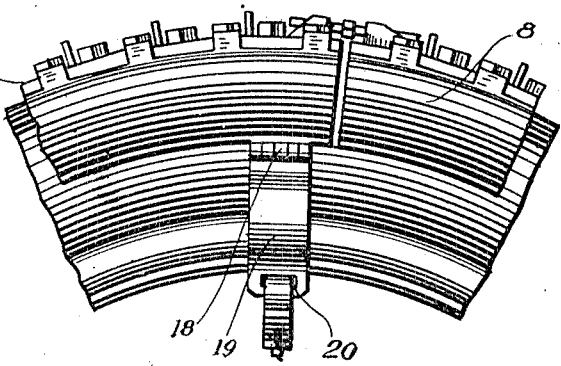
WITNESSES
INVENTOR
Aladár Scbessy &
Serban Remusz
By Henry C. Evert
ATTORNEY

UNITED STATES PATENT OFFICE.

ALADAR SCBESSY AND SERBAN REMUSZ, OF SOUTH BETHLEHEM, PENNSYLVANIA.

ANTISKIDDING DEVICE FOR PNEUMATIC TIRES.

1,118,880. Specification of Letters Patent. Patented Nov. 24, 1914.

Application filed July 22, 1914. Serial No. 852,432.

*To all whom it may concern:*

Be it known that we, ALADAR SCBESSY and SERBAN REMUSZ, subjects of the King of Hungary, residing at South Bethlehem, in the county of Northampton and State of Pennsylvania, have invented certain new and useful Improvements in Antiskidding Devices for Pneumatic Tires, of which the following is a specification, reference being had therein to the accompanying drawing.

This invention relates to anti-skidding devices for pneumatic tires, and has for its object to provide a device of such class, in a manner as hereinafter set forth, for not only reducing skidding to a minmum when a wheel equipped with a device in accordance with this invention is traveling over a slippery road surface, but further to act as a means to reduce puncturing of the outer shoe of a tire to a minimum.

Further objects of the invention are to provide an anti-skidding device for pneumatic tires, which is comparatively simple in its construction and arrangement, strong, durable, efficient and convenient in its use, and inexpensive.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—Figure 1 is a sectional elevation of a pneumatic tire showing the adaptation therewith of an anti-skidding device in accordance with this invention, Fig. 2 is a cross sectional view thereof, and Fig. 3 is an enlarged side elevation of a portion of a pneumatic tire showing the adaptation therewith of an anti-skidding device in accordance with this invention.

Referring to the drawings, 1 denotes a rim in which is mounted an outer shoe 2, the latter being retained in position by the clencher flanges 3. The rim 1 has secured to its inner face a band 4 and anchored in said band 4, as at 5, is a series of inwardly extending bolts 6, having threaded free ends provided with nuts 7.

Mounted upon the outer shoe 2, is an annulus formed of two sections, and each of which consists of a flexible body portion 8, which is substantially semi-elliptic in cross section and which has secured to the periphery thereof a metallic plate 9, having outwardly projecting flanges 10, which are cut away to provide projections. The projections of one of the flanges 10 are indicated at 11 and the projections of the other flange 10 are indicated at 12. The projections 11 are alternately disposed with respect to the projections 10. Secured to the inner face of each of said projections is a vertically disposed V-shaped tooth 13, and each of said teeth 13 is of greater height than its respective projection. Secured to the outer face of the body portion 8, centrally thereof, are spaced triangular teeth 14, and which are arranged out of transverse alinement with respect to said projections.

Surrounding each of the bolts 6, and bearing against the band 4 is a bow-shaped spring 15, having curved ends 16, and surrounding each of the bolts 6 and bearing against the curved ends of a spring 15 is a curved laminated spring 17, which has its curvature oppositely disposed with respect to the curvature of the bow-shaped spring 15. The nuts 7 are adapted to bear against the laminated spring 17.

Hinged to each side of the body portion 8, as at 18 is a plurality of retaining straps 19, each of which has its free end formed with a slot 20. The straps 19 are arranged in pairs and extending through the slots 20 of a pair of straps 19 are the curved ends 21 of a laminated spring 17.

Each of the sections of the annulus, has its body portion provided at each end with a lug 22, having an opening with the wall thereof threaded. The lugs 22 of one body portion 8 oppose the lugs 22 of the other body portion 8, and engaging with the threaded walls of the openings of said opposing lugs 22 is an adjusting bolt 23, the function of which is to connect the sections of the annulus together and for maintaining the annulus upon the outer shoe 2. The bolts 23 when adjusted can take up any looseness of the sections in the annulus with respect to the outer shoe 2.

The straps 19 in connection with the bolts 6, nuts 7 and springs 15 and 17 provide a resilient connecting means whereby the annulus is detachably connected to the outer shoe and which furthermore prevents the annulus from flying off the outer shoe.

What we claim is:—

1. An anti-skidding device for tires comprising an annulus formed of a plurality of sections detachably connected together, each of said sections consisting of a flexible body portion having a metallic plate secured thereto, said plate provided with a plurality of flanges, said flanges cut away to form projections, V-shaped teeth secured to the inner face of and projecting from each of said projections, triangular teeth secured to said plate and extending beyond the projections, and means for securing each of said sections in position upon the tire.

2. An anti-skidding device for tires comprising an annulus formed of a plurality of sections detachably connected together, each of said sections consisting of a flexible body portion having a metallic plate secured thereto, said plate provided with a plurality of flanges, said flanges cut away to form projections, V-shaped teeth secured to the inner face of and projecting from each of said projections, triangular teeth secured to said plate and extending beyond the projections, and means for securing each of said sections in position upon the tire, said projections alternately disposed with respect to each other.

In testimony whereof we affix our signatures in the presence of two witnesses.

ALADAR SCBESSY.
SERBAN REMUSZ.

Witnesses:
MÉSZAROS ILLÉS,
JACOB F. SCHLOSSERS.

Copies of this patent may be obtained for five cents each, by addressing the "Commissioner of Patents, Washington, D. C."